United States Patent [19]

Mellwig et al.

[11] Patent Number: 4,835,815
[45] Date of Patent: Jun. 6, 1989

[54] CASTER WITH BLOCKING DEVICE AND DEPRESSIBLE RELEASING MEMBER FOR THE BLOCKING DEVICE

[75] Inventors: Dieter Mellwig; Hans-Willi Lange, both of Wermelskirchen, Fed. Rep. of Germany

[73] Assignee: Albert Schulte Söhne GmbH & Co., Wermelskirchen, Fed. Rep. of Germany

[21] Appl. No.: 199,114

[22] Filed: May 26, 1988

[30] Foreign Application Priority Data

May 27, 1987 [DE] Fed. Rep. of Germany ....... 3717896

[51] Int. Cl.$^4$ ............................................. B60B 33/02
[52] U.S. Cl. ..................................... 16/35 R; 188/1.12
[58] Field of Search ....................... 16/35 R; 188/1.12

[56] References Cited

U.S. PATENT DOCUMENTS

| 4,035,864 | 7/1977 | Schroder | 16/35 R |
|---|---|---|---|
| 4,658,466 | 4/1977 | Vollberg et al. | 16/35 R |
| 4,720,893 | 1/1988 | Mellwig et al. | 16/35 R |

FOREIGN PATENT DOCUMENTS

| 279090 | 2/1970 | Fed. Rep. of Germany | 16/35 R |
|---|---|---|---|
| 1303706 | 2/1973 | Fed. Rep. of Germany | |
| 2260843 | 7/1974 | Fed. Rep. of Germany | 16/35 R |
| 3420054 | 12/1985 | Fed. Rep. of Germany | 16/35 R |
| 2504066 | 10/1982 | France | 16/35 R |
| 56-34505 | 4/1981 | Japan | 16/35 R |

*Primary Examiner*—Fred A. Silverbery
*Attorney, Agent, or Firm*—Peter K. Kontler

[57] ABSTRACT

A caster wherein the inverted U-shaped frame carries a wheel and is turnable relative to a support about a substantially vertical axis when the wheel rests on a horizontal supporting surface. The web of the frame overlies a braking pedal which can be pivoted to and from an operative position in which it blocks rotation of the wheel relative to the frame and/or blocks angular movements of the frame relative to the support. A leaf spring of the braking lever biases the latter to its inoperative position, and a pedal which is pivotably mounted in the frame can be depressed to pivot the lever to and to releasably hold the lever in the operative position. The pedal can be pivoted in a direction to permit the leaf spring to return the lever to inoperative position in response to depression of a substantially vertically reciprocable pusher which is mounted in the web of the frame.

19 Claims, 2 Drawing Sheets

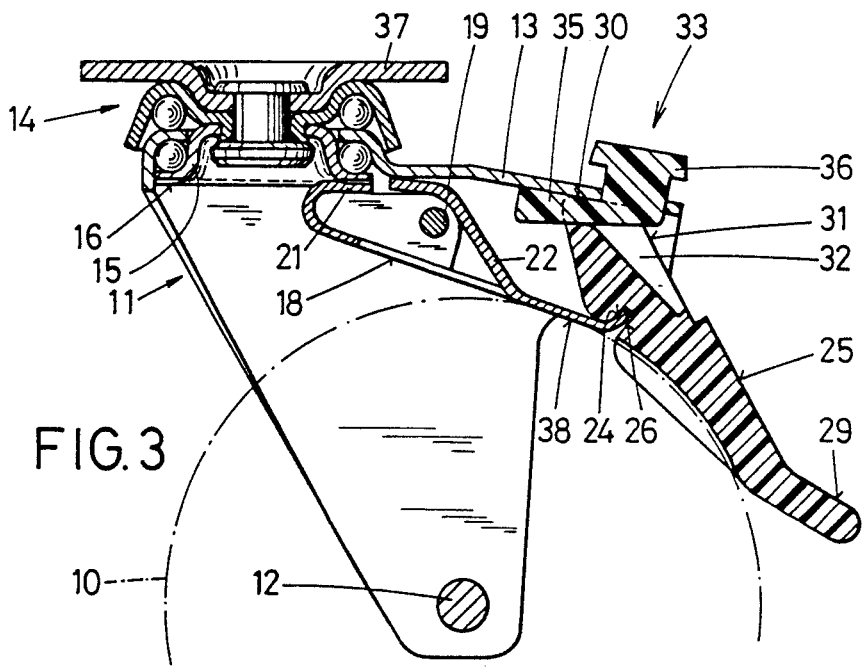
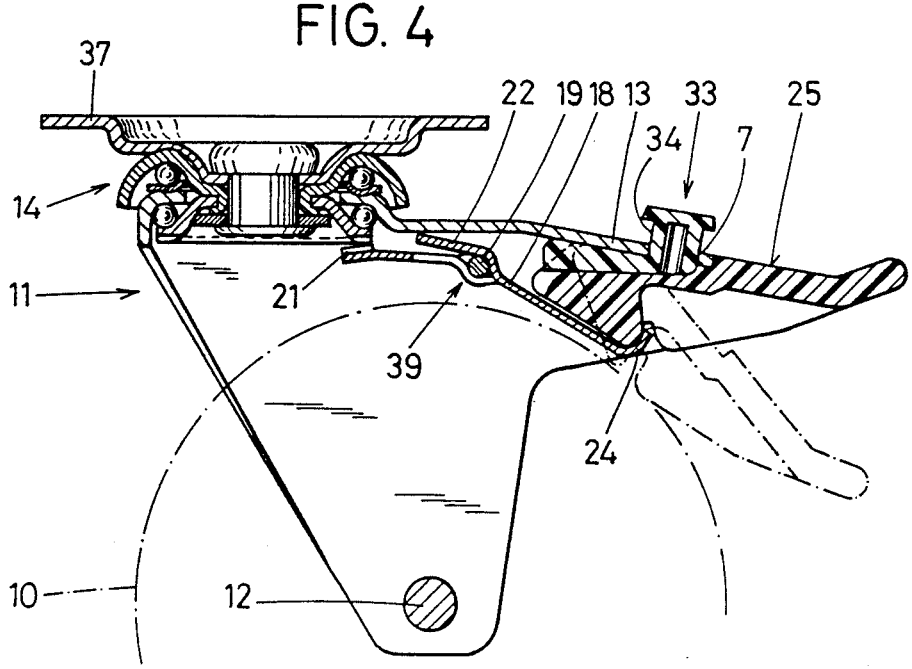

CASTER WITH BLOCKING DEVICE AND DEPRESSIBLE RELEASING MEMBER FOR THE BLOCKING DEVICE

BACKGROUND OF THE INVENTION

The invention relates to casters in general, and more particularly to improvements in casters of the type wherein the wheel and/or the frame for the wheel can be held against rotation by a blocking device which is movably mounted in the frame.

It is known to provide a caster with a blocking device in the form of a braking lever which is biased to inoperative position but can be pivoted to an operative position in which the lever prevents the wheel from rotating relative to the frame and/or prevents the frame from turning relative to its support, e.g., a support which is attached to a piece of furniture or to any other part which is mounted on one, two or more casters. The means for pivoting the lever to its operative position can include a pedal which is pivotably mounted in the frame and has a projecting arm which can be depressed by a boot or by another article of footwear (or by hand) to pivot the braking lever to the operative position.

German Pat. No. 1,303,706 to Möbus discloses a caster with a wedge-like braking lever which is a leaf spring and whose apex is disposed in the space beneath the web of an inverted U-shaped frame for the wheel of the caster. The braking lever has an upper leg and a lower leg, and these legs can be spread apart by a pedal which is pivotably mounted in the frame and defines with the lower leg of the braking lever a hinge providing a pivot axis for the pedal. The upper leg of the braking lever has a slot for a projection of the pedal so that the pedal is confined to controlled angular movements about the pivot axis. The pedal must be depressed in order to pivot the braking lever to the operative position, and the pedal must be pivoted in the opposite direction in order to enable the braking lever to reassume the inoperative position. As a rule, the pedal is depressed by an article of footwear, and the same article of footwear can be used to pivot the pedal in the opposite direction so as to enable the braking lever to permit angular movements of the frame relative to its support and/or angular movements of the wheel relative to the frame. The just described mode of pivoting the pedal is not entirely satisfactory, especially if the pedal is to be depressed or lifted by a female operator. Moreover, the lifting of the pedal can entail damage to the article of footwear, especially separation of the sole from the upper.

German Pat. No. 2,459,580 to Tente-Rollen (corresponding to U.S. Pat. No. 4,035,864) discloses a modified caster wherein the braking lever can oppose or prevent rotation of the frame relative to the support as well as rotation of the wheel relative to the frame. The braking lever is pivotably mounted in the frame and can be pivoted by a pedal which is also pivotable in and is supported by the frame. A portion of the pedal extends from the rear end of the frame and can be depressed by an article of footwear so as to pivot the braking lever to the operative position. The pedal comprises a depressible resetting member which projects upwardly through and beyond the web of the inverted U-shaped frame and can be depressed by an article of footwear to thereby return the pedal to a position in which the braking lever is free to assume its inoperative position. Depression of the pedal for the purpose of pivoting the braking lever to operative position entails a pivotal movement of the resetting member to a position in which it must be pushed from one side in order to permit return movement of the braking lever to its inoperative position. The web of the frame has a relatively large slot for the resetting member, and a substantial portion of such slot is free for penetration of impurities into the frame of the caster when the braking lever is held in the operative position. This is particularly undesirable if the caster is used on pieces of furniture and/or on other mobile structures in a hospital, in a kitchen or in a like establishment where certain foreign matter which penetrates into the interior of the frame can constitute a breeding ground for bacteria. Moreover, the orientation of the resetting member in the operative position of the braking lever is such that the operator must maintain her or his foot in an awkward position (with the underside of the sole of the article of footwear in a nearly vertical plane) in order to pivot the pedal back to that position in which the braking lever is inoperative. Still, further, it is often difficult or plain impossible to find sufficient room for such orientation of an article of footwear when the caster is located adjacent a wall or another immovable part while the blocking lever is held in the operative position.

Casters with means for blocking rotation of the wheel and/or for preventing the wheel frame from swiveling relative to its support are further disclosed in commonly owned U.S. Pat. Nos. 4,658,466 (granted Apr. 21, 1987 to Vollberg et al.) and 4,720,893 (granted Jan. 26, 1988 to Mellwig et al.).

OBJECTS AND SUMMARY OF THE INVENTION

An object of the invention is to provide a caster wherein the means for blocking the wheel and/or the frame for the wheel can be returned to inoperative position (or caused or permitted to return to inoperative position) by a part which is readily accessible to the operator and which can be actuated without necessitating the movement of an article of footwear or the like to an awkward position.

Another object of the invention is to provide a caster with novel and improved means for displacing the pedal which is used to move the braking or blocking means to operative position.

A further object of the invention is to provide a novel and improved pedal and a novel and improved blocking or braking device for use in the above outlined caster.

An additional object of the invention is to provide a caster wherein the movement of the pedal in a direction to advance the blocking device to operative position, as well as the movement of the pedal in the opposite direction, can be effected in response to substantially vertical movement of an article of footwear.

A further object of the invention is to provide a novel and improved method of initiating movements of the pedal relative to the frame of the caster for the purpose of moving the blocking device to or from its operative position.

Still another object of the invention is to provide a caster wherein the blocking device is movably mounted in the frame in a novel and improved way.

An additional object of the invention is to provide a novel and improved operative connection between the pedal and the blocking device of the above outlined caster.

A further object of the invention is to provide a novel and improved displacing or resetting device for the pedal of the above outlined caster.

The invention resides in the provision of a caster which comprises a support (such as a plate-like member which can be affixed to the leg of a piece of furniture), a frame member which is mounted on the support for angular movement about a first axis (such axis is normally vertical when the caster is in actual use), a wheel member which is mounted in the frame member for angular movement about a second axis extending substantially at right angles to the first axis (the second axis is normally horizontal or substantially horizontal when the wheel member rests on a horizontal or nearly horizontal surface), a blocking device which is mounted in the frame member for movement between an operative position in which the blocking devices opposes or prevents angular movement of at least one of the two members (namely the frame member and the wheel member) about the respective axis and an inoperative position in which the at least one member is movable about the respective axis, a pedal which is mounted in the frame member and engages the blocking device and is movable from a first to a second position to thereby move the blocking device to the operative position, and displacing means for moving the pedal from the second position. The displacing means includes a pusher which is mounted in the frame member for movement in substantial parallelism with the first axis, namely substantially vertically in the normal position on the caster.

The frame member has a web and preferably two legs which extend downwardly from and define with the web a space for a portion of the wheel member. The pedal and the blocking device preferably define a hinge having a third axis which is substantially parallel to the second axis (of the wheel member), and the blocking device is pivotable in the space of the frame member between its operative and inoperative positions about a fourth axis which is substantially parallel to the second axis. The pedal has a portion which is located in the space of the frame member and abuts the web in each position of the pedal. Such caster can further comprise means for biasing the blocking device to its inoperative position.

The pusher is preferably reciprocably mounted in the web of the frame member. The pedal can be provided with a socket, and the pusher can include a portion which is overlapped by the web and is disposed in the socket of the pedal. A second portion of the pusher extends outwardly through an opening of the web and substantially at right angles to the portion which is disposed in the socket of the pedal.

The pedal peferably includes or constitutes a lever which has a first arm in the frame member, a second arm outside of the frame member, and a recess between the two arms. The blocking device can be provided with a fulcrum which extends into the recess and defines for the pedal the aforementioned third axis. The fulcrum can include a bent-over portion of the blocking device, and the recess can be provided at that side of the pedal which faces away from the underside of the web of the frame member. The upper side of the pedal confronts the underside of the web and preferably includes two mutually inclined surfaces one of which abuts the underside of the web in the first position and the other of which abuts the underside of the web in the second position of the pedal. Such surfaces can make an obtuse angle. The aforementioned socket of the pedal is preferably provided in the upper side of the pedal and is flanked by portions of the first and second surfaces.

The aforementioned second portion of the pusher (which extends through the opening of the web of the frame member) is preferably provided with an enlarged head which limits the extent of movability of the pusher relative to the frame member in one direction, namely in a direction to depress the pusher into the interior of the frame member. In other words, the head of the second portion of the pusher is adjacent the outer or upper side of the web of the frame member.

The means for biasing the blocking device to the inoperative position preferably includes a spring which is provided on the blocking device and bears against the underside of the web of the frame member. The spring can constitute a substantially tongue-like integral portion of the blocking device. A preferred form of the spring is a leaf spring.

The caster further comprises a pivot for the blocking device, and such pivot can be installed in the frame member. The blocking device can have a plurality of bearings or a single bearing for the pivot. If the blocking device is provided with a single bearing, the aforementioned leaf spring of the blocking device can constitute a part of such single bearing.

The novel features which are considered as characteristic of the invention are set forth in particular in the appended claims. The improved caster itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 illustrates the structure of FIG. 1 but with the blocking device in operative position; and FIG. 4 is a central sectional view of a modified caster wherein the blocking device has a single bearing for a pivot which is installed in the frame and movably supports the blocking device.

DESCRIPTION OF PREFERRED EMBODIMENTS

Figure 1:
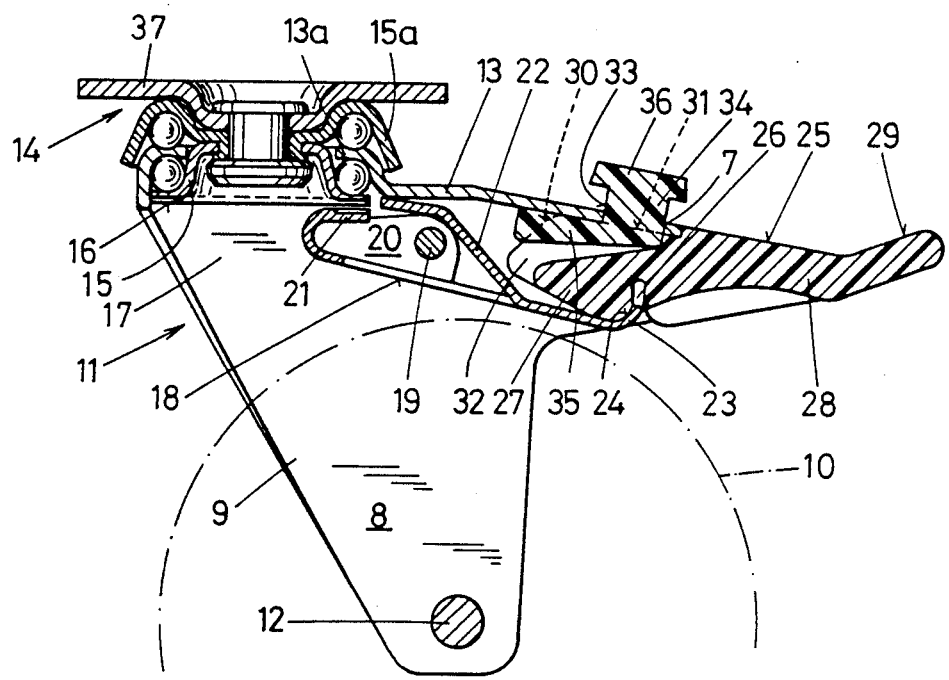
FIG. 1 is a central sectional view of a caster which embodies one form of the invention, the blocking device being shown in the inoperative position.
Figure 2:
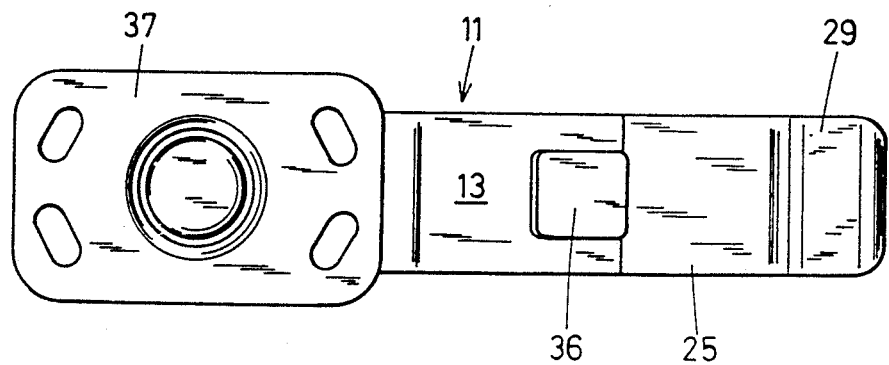
FIG. 2 is a plan view of the caster.

Referring first to FIGS. 1 to 3, there is shown a caster which embodies one form of the present invention. The caster comprises a support 37 which is substantially horizontal when the caster is properly mounted at the underside of a leg forming part of a piece of furniture or the like. The support 37 carries a frame member 11 which is an inverted U-shaped body with a substantially horizontal web 13 at the top and at least one but preferably two depending legs 9 defining with the web 13 a space 8 for a portion of a wheel member 10. The latter is rotatable about a normally horizontal axis which is defined by a shaft 12 having its end portions secured to the lower end portions of the legs 9. The frame member 11 is rotatable relative to the support 37 about a normally vertical axis which is defined by a bearing 14 having a lower race 15 which is rigid with the support 37 and is located beneath a first annulus of spherical rolling elements. The web 13 has a portion 13a which overlies the lower annulus of rolling elements and constitutes a second race of the bearing 14. The lower race 15 is rigid with a top portion 15a of the bearing 14 which confines a second annulus of spherical antifriction rolling elements above the second race 13a between the two annuli of rolling elements.

The underside of the race 15 has a ring of teeth 16 which can be engaged by one or more complementary teeth 21 on the adjacent portion of a two-armed blocking device 18 in the form of a braking lever 18 mounted in the space 8 for angular movement about the horizontal axis of a pivot 19. The latter is parallel to the shaft 12 for the wheel member 10. The blocking device 18 has an integral leaf spring 22 which is a tongue bent out of the central portion of the body of the blocking device and bears against the underside of the web 13 in the region of the bearing 14 to normally maintain the blocking device in the inoperative position of FIG. 1 in which the tooth or teeth 21 are disengaged from the adjacent teeth 16 of the lower race 15 and the right-hand arm of the blocking device is spaced apart from and cannot brake the peripheral surface of the wheel member 10. The end portions of the pivot 19 for the blocking device 18 are mounted in the legs 9 of the frame member 11. The blocking device 18 has two substantially vertical flanges 20 which constitute bearings for the pivot 19. One such flange is provided at that side of the blocking device 18 which faces away from the observer of FIG. 1, and the other flange 20 is located at the front side of the blocking device. The flanges 20 can constitute bent-over portions of the blocking device 18. The tongue-like leaf spring 22 of the blocking device 18 overlies the pivot 19 between the flanges 20.

That arm of the blocking device 18 which is remote from the tooth or teeth 21 is provided with an upwardly extending projection 23 constituting a fulcrum 24 in a transversely extending recess 26 provided in the underside of a pivotable pedal 25. The pedal 25 has a first arm 27 in the space 8 between the web 13 at the legs 9 of the frame member 11, and a second arm 28 which is located behind the support 37 (as seen in the direction of normal advancement of the caster when the wheel member 10 is caused to roll along a substantially horizontal supporting surface). The arm 28 of the pedal 25 has an extension 29 which constitutes an actuating portion and can be depressed substantially vertically downwardly from the position of FIG. 1 to the position of FIG. 3 to thereby pivot the blocking device 18 from the inoperative position of FIG. 1 to the operative position of FIG. 3 in which the tooth or teeth 21 mesh with the adjacent teeth 16 and the underside 38 of the right-hand arm of the blocking device 18 engages the peripheral surface of the wheel member 10. In other words, the blocking device 18 then prevents rotation of the frame member 11 relative to the support 37 and vice versa, and the blocking device 18 also prevents or strongly opposes rotation of the wheel member 10 in either direction.

The arm 27 of the pedal 25 has a substantially convex portion which can roll along the upper side of the right-hand arm of the blocking device 18 in the region of the fulcrum 24, i.e., adjacent the recess or slot 26 in the underside of the pedal 25. The upper side of the arm 27, namely the side which confronts the underside of the web 13 of the frame member 11, has a socket 32. Such upper side includes two mutually inclined surfaces 30 and 31 each having a first portion at one side and a second portion at the other side of the socket 32. The surface 31 abuts the underside of the web 13 in the inoperative position of the blocking device 18 (see FIG. 1), and the surface 30 abuts the underside of the web 13 in the operative position of the blocking device (see FIG. 3). It can be said that the arm 27 of the pedal 25 has a substantially trapeziform cross-sectional outline. The surfaces 30 and 31 make an obtuse angle which can substantially exceed 90 degrees. The socket 32 is located opposite the recess 26 in the underside of the pedal 25 and receives a substantially horizontal first portion 35 of a vertically or substantially vertically reciprocable displacing means here shown as a pusher 33 having a shank 34 reciprocable in an opening 7 provided in the web 13 at a location which is remote from the bearing 14. The shank 34 forms part of a second portion of the pusher 33, and such second portion further includes an enlargement in the form of a head 36 which limits the extend to which the pusher 33 can be depressed substantially vertically, namely in substantial parallelism with the axis which is defined by the bearing 14. The surface 31 at the upper side of the pedal 25 automatically bears against the underside of the web 13 when the leaf spring 22 of the blocking device 18 is free to maintain the parts 18 and 25 in the positions which are shown in FIG. 1. The leaf spring 22 is also active when the blocking device 18 is caused to assume the operative position of FIG. 3; at such time, the leaf spring 22 ensures that the surface 30 of the arm 27 of the pedal 25 bears against the underside of the web 13.

When the wheel member 10 is to remain free to roll along a supporting surface about the horizontal axis of the shaft 12, the blocking device 18 assumes the inoperative position of FIG. 1 in which the leaf spring 22 causes the tooth or teeth 21 to remain spaced apart from the adjacent teeth 16 of the race 15 of the bearing 14, and the underside 38 of the right-hand arm of the blocking device 18 is remote from the peripheral surface of the wheel member 10. In other words, the wheel member 10 is then free to turn about the axis which is defined by the shaft 12, and the web 13 of the frame member 11 is free to swivel about the vertical axis which is defined by the bearing 14. If the operator wishes to move the blocking device 18 to the operative position of FIG. 3, she or he simply steps onto the actuating portion or extension 29 of the arm 28 of the pedal 25 and moves the extension 29 substantially vertically downwardly from the position of FIG. 1 whereby the entire pedal pivots relative to the blocking device 18 about the horizontal axis which is defined by the fulcrum 24. This causes the surface 31 at the upper side of the arm 27 of the pedal 25 to move away from the underside of the web 13 until the underside of the web is engaged by the surface 30. This terminates the pivotal movement of the pedal 25 at a time when the arm 27 of the pedal assumes an angular position (see FIG. 3) in which the surface 30 cooperates with the web 13 to maintain the underside 38 of the right-hand arm of the blocking device 18 in frictional engagement with the peripheral surface of the wheel member 10 and in which the tooth or teeth 21 of the blocking device 18 engage the adjacent teeth 16. The surface 30 ensures that the pedal 25 cannot be accidentally moved away from the second or depressed position of FIG. 3. The leaf spring 22 then biases the surface 30 against the underside of the web 13 while simultaneously biasing the underside 38 of the right-hand arm of the blocking device 18 against the peripheral surface of the wheel member 10. In addition, the leaf spring 22 biases the tooth or teeth 21 of the blocking device 18 into mesh with the adjacent teeth 16 which cannot rotate relative to the support 37.

If the operator thereupon wishes to return the blocking device 18 to the inoperative position of FIG. 1, she or he steps on the enlarged head 36 of the substantially vertically extending portion 34, 36 of the pusher 33 so that the head 36 moves toward and ultimately abuts the upper side of the web 13. This causes the substantially horizontally extending portion 35 of the pusher 33 to engage the adjacent portion of the arm 27 of the pedal 25 so that the pedal pivots about the axis which is defined by the fulcrum 24 of the blocking device 18. The surface 30 moves away from the underside of the web 13, and the leaf spring 22 is free to pivot the blocking device 18 in a counterclockwise direction (as seen in FIG. 3) so that the underside 38 of the right-hand arm of the blocking device 18 moves away from the peripheral surface of the wheel member 10 and the tooth or teeth 21 move out of mesh with the adjacent tooth or teeth 16. The leaf spring 22 causes the surface 31 at the upper side of the pedal 25 to move into abutment with the underside of the web 13 so that the pedal 25 is then held in the first position which is shown in FIG. 1. At the same time, the blocking device 18 is held by its leaf spring 22 in the inoperative position of FIG. 1. As mentioned above, the shank 34 of the pusher 33 is reciprocable in its opening 7 substantially vertically, namely in substantial parallelism with the axis of the bearing 14 and substantially at right angles to the axis of the shaft 12 for the wheel member 10. Since the head 36 of the pusher 33 is remote from the support 37, it is readily accessible to the sole of an article of footwear for depression in order to return, or to bring about the return of, the blocking device 18 to the inoperative position of FIG. 1. Downward pressure upon the head 36 of the pusher 33 can be terminated or relaxed as soon as the pedal 35 is pivoted sufficiently to ensure that the leaf spring 22 is free to move the surface 31 at the upper side of the pedal 25 into abutment with the underside of the web 13.

The dimensions of the head 36 of the pusher 33 can be readily selected in such a way that such head can be conveniently located by the foot of the operator in order to depress the pusher 33 to an extent which is necessary to enable the leaf spring 22 to return the blocking device 18 and the pusher 25 to the positions which are shown in FIG. 1. The extent of downward movement of the pusher 33 in order to effect a return movement of the blocking device 18 to the inoperative position of FIG. 1 depends on the configuration of the pedal 25 and upon the manner of its mounting on the fulcrum 24 of the blocking device 18. All that is necessary is to pivot the pedal 25 until it reaches the dead-center position in which the leaf spring 22 can take over to complete the pivotal movement of the pedal 25 and blocking device 18 from the positions which are shown in FIG. 3 to the positions which are shown in FIG. 1.

The socket 32 constitutes an optional feature of the pedal 25. Such socket is desirable and advantageous because it can accommodate a substantial portion of the pusher 33 (namely a part of or the entire substantially horizontal portion 35) so that the space requirements of the pedal 25 plus pusher 33 are reduced to a minimum.

The feature that the portion 35 of the pusher 33 extends substantially at right angles to the portion which includes the shank 34 and the head 36 is desirable and advantageous because this also contributes to a reduction of space requirements of the pusher and enables the portion 34, 36 to exert the necessary force in order to pivot the pedal 25 from the position of FIG. 3 with a minimum of effort.

The feature that the fulcrum 24 extends into the recess 26 at the underside of the pedal 25 is desirable and advantageous because such mounting of the pedal 25 ensures that the pedal is properly guided for pivotal movement relative to the frame member 11 and blocking device 18. The feature that the socket 32 receives the portion 35 of the pusher 33 also contributes to a more predictable guidance of the pedal 25 during its pivotal movement between the positions of FIGS. 1 and 3. The surfaces 30 and 31 at the upper side of the arm 27 of the pedal 25 ensure that the pedal 25 is pivotable between two predetermined end positions in one of which the underside of the web 13 is engaged by the surface 30 (see FIG. 3) and in the other of which the underside of the web 13 is engaged by the surface 31 (see FIG. 1). As mentioned above, each of the surfaces 30, 31 preferably comprises two portions which flank the socket 32 in the upper side of the arm 27 of the pedal 25.

The head 36 of the pusher 33 performs another advantageous and desirable function, namely it prevents penetration of the entire pusher into the space 8 between the legs 9 of the frame member 11.

It is clear that the integral leaf spring 22 of the blocking device 18 can be replaced with a separately produced spring as long as the spring is capable of biasing the blocking device to the inoperative position of FIG. 1. The construction which is shown in the drawing is preferred at this time because it contributes to lower cost and compactness of the blocking device.

FIG. 4 shows a modified caster wherein all such parts which are identical with or clearly analogous to corresponding parts of the caster of FIGS. 1 to 3 are denoted by similar reference characters. One of the differences between the two casters is that the pusher 33 of FIG. 4 is provided with a hollow second portion which extends through the opening 7 in the web 13 of the frame member 11. The shank 34 of this pusher can receive a reinforcing member in the form of a metallic pin or the like.

Another difference between the two casters is that the blocking device 18 of the caster which is shown in FIG. 4 defines for the pivot 19 a single bearing 39 which includes a portion of the leaf spring 22. This obviates the need for the flanges 20 of the blocking device 18 shown in FIGS. 1 and 3. The single bearing 39 of FIG. 4 contributes to compactness and simplicity of the blocking device 18.

The improved caster is susceptible of many additional modifications without departing from the spirit of the invention. For example, the blocking device 18 can be designed to merely oppose or prevent rotation of the wheel member 10 when it assumes the operative position of FIG. 3. Alternatively, the blocking device 18 can be designed to merely oppose or block angular movements of the frame member 11 and support 37 relative to each other. Still further, the configuration and dimensions of the pusher 33 and pedal 25 can be modified in a number of different ways. All that counts is to ensure that the pedal 25 can be depressed substantially vertically in order to move the blocking device 18 to the operative position, and that the pusher 33 is readily accessible and can be pushed subsantially vertically in order to enable the leaf spring 22 or analogous biasing means to return the blocking device to its inoperative position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A caster comprising a support; a frame member having an opening and mounted on said support for angular movement about a first axis; a wheel member mounted in said frame member for angular movement about a second axis extending substantially at right angles to said first axis; a blocking device mounted in said frame member for movement between an operative position in which said device opposes or prevents angular movement of at least one of said members about the respective axis, and an inoperative position in which said at least one member is movable about the respective axis; a pedal mounted in said frame member, engaging said device and movable from a first to a second position to thereby move said device to the operative position; and displacing means for moving said pedal from said second position, including a pusher mounted in said frame member for movement in substantial parallelism with said first axis, said pusher having a first portion which extends through and is reciprocable in the opening of said frame member, said portion of said pusher having an enlargement which limits the extent of movability of said pusher relative to said frame member in one direction.

2. The caster of claim 1, wherein said frame member has a web and two legs defining with the web a space for a portion of said wheel member, said pedal and said device defining a hinge having a third axis which is substantially parallel to said second axis and said device being pivotable in said space between said operative and inoperative positions about a fourth axis which is substantially parallel to said second axis, said pedal having a portion which is located in said space and abuts said web in each position of said pedal, and further comprising means for biasing said device to said inoperative position.

3. The caster of claim 1, wherein said frame member has a web and at least one leg rotatably supporting said wheel member, said pusher being reciprocably mounted in said web.

4. The caster of claim 3, wherein said pedal has a socket and said pusher includes a second portion which is overlapped by said web and is disposed in said socket.

5. The caster of claim 3, wherein said pusher further includes a second portion which is overlapped by said web and engages said pedal, said first portion of said pusher extending outwardly through said web substantially at right angles to said second portion.

6. The caster of claim 1, wherein said pedal includes a lever having a first arm in said frame member, a second arm and a recess between said arms, said device having a fulcrum extending into said recess and defining for the pedal a pivot axis.

7. The caster of claim 1, wherein said frame member has a web and at least one leg rotatably supporting said wheel member, said web having an inner side confronting said wheel member and an outer side, said opening being provided in said web and said enlargement being adjacent the outer side of the web.

8. The caster of claim 1, further comprising means for biasing said device to said inoperative position, including a spring provided on said device and bearing against said frame member.

9. The caster of claim 8, wherein said spring constitutes a substantially tongue-like integral portion of said device.

10. The caster of claim 8, wherein said frame member includes a web and at least one leg rotatably supporting said wheel member, said web having an inner side facing said wheel member and said spring including a leaf spring which is integral with said device and bears against the inner side of said web.

11. The caster of claim 1, further comprising a pivot for said device, said pivot being installed in said frame member and said device having a plurality of bearings for said pivot.

12. The caster of claim 1, further comprising a pivot for said device, said pivot being installed in said frame member and said device having a single bearing for said pivot.

13. The caster of claim 12, wherein said device further comprises means for biasing said device to said inoperative position, said biasing means forming part of said bearing.

14. A caster comprising a support; a frame member having a web and at least one arm and being mounted on said support for angular movement about a first axis; a wheel member mounted in said at least one arm of said frame member for angular movement about a second axis extending substantially at right angles to said first axis, said web having a side facing said wheel member; a blocking device mounted in said frame member for movement between an operative position in which said device opposes or prevents angular movement of at least one of said members about the respective axis, and an inoperative position in which said at least one member is movable about the respective axis; a pedal mounted in said frame member, engaging said device and movable from a first to a second position to thereby move said device to the operative position, said pedal including a lever having a first arm in said frame member, a second arm and a recess between said arms, said device having a fulcrum extending into said recess and defining for the pedal a pivot axis, said pedal having a side facing away from said side of said web and being provided with said recess, said fulcrum including a bent-over portion of said device; and displacing means for moving said pedal from said second position, including a pusher mounted in said frame member for movement in substantial parallelism with said first axis.

15. The caster of claim 14, wherein said device is pivotable relative to said frame member about a third axis which is substantially parallel to said second axis and the pivot axis which is defined by said fulcrum is substantially parallel to said third axis.

16. The caster of claim 14, wherein said pedal has a second side confronting the side of said web and including two mutually inclined sufaces one of which abuts the side of the web in the first position and the other of which abuts the side of the web in the second position of said pedal.

17. The caster of claim 16, wherein said surfaces make an obtuse angle.

18. The caster of claim 16, wherein said second side of said pedal has a socket which is flanked by portions of said first and second surfaces, said pusher having a second portion which is adjacent said side of the web and is disposed in said socket.

19. The caster of claim 14, wherein said frame member has an opening and said pusher has a portion which extends through and is reciprocable in said opening, said portion having an enlarged head which limits the extent of movability of said pusher relative to said frame member in one direction.

* * * * *